April 5, 1955 R. V. POUND 2,705,752
MICROWAVE COMMUNICATION SYSTEM
Filed March 14, 1946
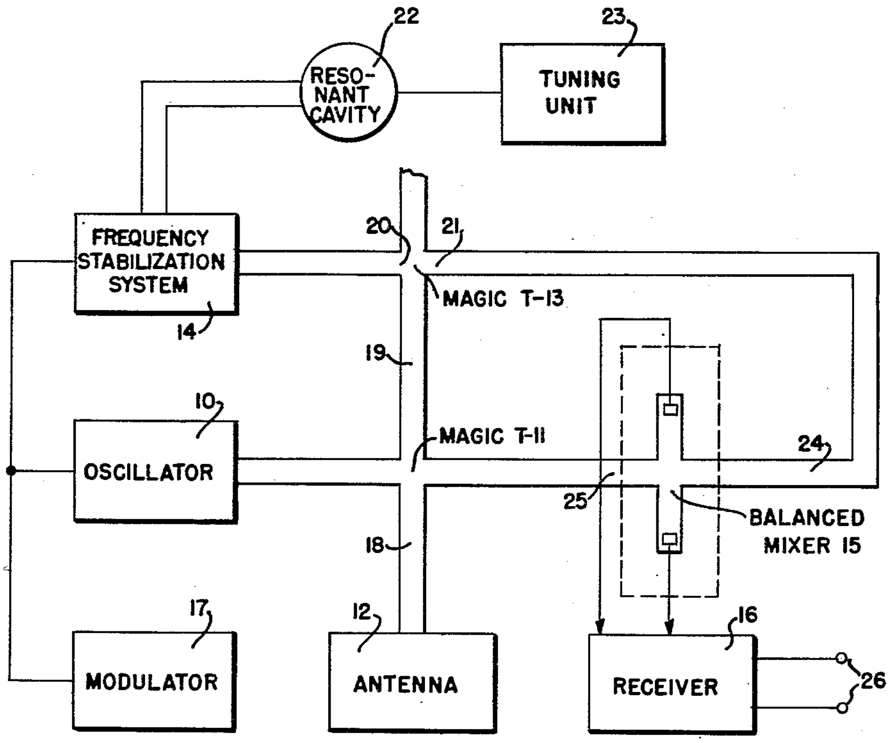
INVENTOR.
ROBERT V. POUND
BY M. A. Hayes
ATTORNEY 2,705,752
Patented Apr. 5, 1955

2,705,752

MICROWAVE COMMUNICATION SYSTEM

Robert V. Pound, Cambridge, Mass., assignor, by mesne assignments, to the United States of America as represented by the Secretary of the Navy Application March 14, 1946, Serial No. 654,499

7 Claims. (Cl. 250—13)

This invention relates to electrical apparatus, and more particularly to systems for communicating between a plurality of locations.

Radio communication systems, both frequency and amplitude modulated, commonly operate at frequencies in or below the V. H. F. (very high frequency) band, most communicating being satisfactorily carried on at frequencies of less than 150 megacycles. For some purposes, however, it is desirable to possess a communication system which operates at microwaves. Since the virtues of microwaves in applications where this type of equipment functions satisfactorily are not so great as to be accepted without question, a qualitative analysis of such virtues, and of the disadvantages in the use of microwaves, is pertinent.

First, and of utmost importance, is a consideration of the effect of wavelength on range for a system of a given power level. Because of the absence of reflections from the ionosphere, wavelengths shorter than about 10 meters are usually restricted to line of sight communications. It can be shown, quantitatively, that for ordinary omnidirectional communications, the range for a given transmitter power and receiver sensitivity goes down as the wavelength. Since it becomes increasingly difficult to produce a given transmitted power as the wavelength is decreased this sort of service is impractical. If communication is desired, however, between two stations in known relative positions, directional high gain antennas, of convenient size at microwaves, may be employed. Similarly, communications may be carried on with one directional and one omnidirectional antenna at a great saving of transmitted power.

Another important consideration is that of radio dark regions. In transmissions over a smooth conducting surface interference between a direct wave and one reflected from the surface is encountered. This makes for a radio dark region just above the conducting surface. The height of such a dark region at a given range is proportional to the wavelength, which fact gives microwaves a distinct advantage over longer wavelengths for communication work.

Still another striking advantage of microwave communications is the availability of channels in a band of a given percentage width, the number of channels being proportional to the reciprocal of the wavelength. The necessary bandwidth of a particular station is decided by the type of information the station transmits and is independent of the carrier frequency. The criterion which frequently decides the channel bandwidth is the carrier frequency stability, rather than the bandwidth necessary to transmit the information involved. Under such conditions, the system fails to utilize the advantage of microwaves in two respects: (1) the number of available channels is considerably reduced; and (2) the power necessary for satisfactory communication is greatly increased because of the increased noise power in a wide band receiver. This accentuates the desirability of an effective means of stabilizing the transmitting oscillator. Since it will also be necessary to stabilize the receiver local oscillator, using the same stabilized oscillator as both the receiver local oscillator and as the transmitting oscillator will aid in increasing the number of channels.

Considering the situation where one oscillator is used for both transmitting and as a first local oscillator, it is apparent that transmitted and received signals must differ in frequency by the intermediate frequency of the system. Establishing of communication with a second station, whose oscillator is tuned to a frequency differing from that of the first station by the intermediate frequency of the duplex system, is immediately evidenced by ability of the first operator to hear his own modulation in his own headset. Without the presence of an incoming carrier, and at the proper frequency, no intermediate frequency signal, or one at the wrong frequency, will be produced. This feature of being able to immediately and positively check contact with a second station is of immeasurable value in eliminating time-consuming verbal confirmations, and also makes for ease of switching channels.

No attempt is made herein to completely analyze the basic system to be described structurally in this specification, or to suggest the many possible embodiments that this invention might take. Similarly a tremendous number of specific uses can be designed for by making modifications in the basic system.

It is the object of the present invention to provide microwave communication apparatus.

It is another object to provide communication apparatus wherein the transmitting and receiving frequencies differ by the intermediate frequency of the system.

Another object is to provide communication apparatus which incorporates applied forms of the magic-T.

These and other objects will be more apparent upon consideration of the following specification, taken with the accompanying drawing, the single figure of which illustrates an embodiment of the present invention.

Briefly, the output of oscillator 10 passes to wave guide magic-T 11 where it is split, half going to antenna 12, and the other half to wave guide the input of magic-T 13. At magic-T 13 the energy again splits, half going to frequency stabilization system 14, the other half going to balanced mixer 15. Modulator 17 applies the intelligence to the carrier signal. Also feeding the balanced mixer are received signals picked up by antenna 12. The intermediate frequency signal appearing at the output of balanced mixer 15 is passed on to receiver 16, where it is amplified and demodulated.

More specifically, oscillator 10 may be one of the common low power reflex klystron oscillators, a continuous wave magnetron, or other adaptable microwave oscillator, the type of tube used being primarily determined by the type of service, and power, required. The output of the oscillator is fed to magic-T 11. The wave guide magic-T was disclosed and claimed in the copending application of Robert L. Kyhl, Serial No. 580,014, filed February 27, 1945, on "Transmission Systems," now abandoned. The magic-T is one example of a class of 8-terminal networks whose impedance matrices possess certain symmetry properties. These networks, which are a form of bridge circuit, can be realized with lumped constants, with microwave or long line elements, or with combinations of these. To form a magic-T comprising wave guides, the axes of four branches must meet in a point. A first and a second of these branches must be symmetrical with respect to a plane which passes through the axes of the third and fourth branches, and which plane is also perpendicular to the electric lines of force within one of the third and fourth branches. The third and fourth branches are so disposed that the electric lines of force therein are mutually perpendicular. Differently stated, the magic-T is a combination of an E-plane and an H-plane T. If constructed with perfect mechanical symmetry there can be no coupling from the E-plane arm to the H-plane arm, or vice versa. The network can include irises or other matching devices so arranged and of such dimensions that when the bridge is observed from any branch, that branch is terminated in its characteristic impedance.

Energy from oscillator 10 splits at magic-T 11, half going out branch 18 to antenna 12, the other half passing through branch 19 to magic-T 13. Antenna 12 may be of a highly directional type or may be practically omnidirectional, depending on the use for which the system is designed. The half of the oscillator signal which passes through branch 19 splits again at magic-T 13, half going out branch 20 to frequency stabilization system 14, the other half passing through branch 21 to balanced mixer 15. It may be desirable to insert an attenuator in branch 20 so that only a portion of the available power will reach frequency stabilization system 14. This frequency control system may be any one of several conventional types. The stabilization circuits utilize the microwave discriminator disclosed and claimed in the copending application of Robert V. Pound, Serial No. 591,584, filed May 2, 1945, entitled Wave Guide T Bridge Detecting Apparatus, Patent No. 2,577,540 issued December 4, 1951. A signal from the oscillator to be stabilized is fed into the input arm of the discriminator so that a voltage is developed at the output of two crystals. This output voltage is amplified and superimposed on the supply voltage to the frequency controlling element of the oscillator, and causes the oscillator to be maintained at the resonant frequency of the cavity 22 associated with the discriminator. Modulation of the frequency of oscillation can be achieved with stabilization acting throughout the modulation frequency period by applying a signal from modulator 17 in series with the output from the discriminator. Tuning unit 23 provides for a shift in operating frequencies by changing the resonant frequency of cavity 22 associated with the frequency stabilization system.

As previously mentioned, substantially half of the input to magic-T 13 is fed to balanced mixer 15 through branch 24. It may be desirable to place an attenuator between magic-T 13 and the mixer. Received signals picked up by antenna 12 are fed into branch 18 of magic-T 11, where they are split, half of the received energy passing into branch 25 of balanced mixer 15. Any suitable type of microwave mixer may be here incorporated. In the present embodiment a balanced mixer is used similar to that disclosed and claimed in the copending application of Robert H. Dicke, Serial No. 586,413, filed April 3, 1945, entitled Waveguide Mixer, Patent No. 2,666,134 issued January 12, 1954. The resulting intermediate frequency signal is passed on to receiver 16 where it is amplified and demodulated. The intelligence appears at output terminals 26.

In adaptations where one of the antennas of the duplex system is a high gain directional antenna continued communication with a moving aircraft, for example, would require continuous alteration of the pointing of the ground station antenna. A tracking control of a conventional type may be used to direct this antenna.

Though the system has been described in connection with operation at microwaves, this does not preclude the possibility of using a low frequency counterpart. The hybrid coil of telephone usage could be substituted for the magic-T, and a similar shift to other low frequency components could be employed.

It is to be noted that the communication system has been disclosed and claimed in a very general form. It will be obvious to one skilled in the art that many modifications can be employed without departing from the spirit of the invention, as sought to be defined in the following claims.

What is claimed is:

1. In a microwave communication system, a transceiver comprising, an oscillator, a tunable resonant reference circuit, a frequency control circuit responsive to the oscillator frequency and the resonance frequency of said reference circuit to control the frequency of said oscillator, means for modulating said oscillator, a mixer, a wave guide directional coupler, and an antenna coupled to said oscillator and said mixer through said directional coupler, whereby a part of said oscillator output is radiated by said antenna and both of said oscillator output and signals received by said antenna are heterodyned by said mixer to yield intermediate frequency signals.

2. In a microwave communication system a transceiver comprising, an oscillator, a tunable resonant reference circuit, a frequency control circuit responsive to the oscillator frequency and the resonance frequency of said reference circuit to control the frequency of said oscillator, means for modulating said oscillator, a mixer, a wave guide directional coupler, an antenna coupled to said oscillator and said mixer through said directional coupler, whereby a part of said oscillator output is radiated by said antenna and both of said oscillator output and signals received by said antenna are heterodyned by said mixer to yield intermediate frequency signals, and means for amplifying and detecting the resulting intermediate frequency signals.

3. In a microwave communication system a transceiver comprising, an oscillator, a resonant reference circuit, a frequency control circuit responsive to the oscillator frequency and the resonance frequency of said reference circuit to control the frequency of said oscillator, means for modulating said oscillator, a mixer, a wave guide directional coupler, an antenna coupled to said oscillator and said mixer through said directional coupler, whereby a part of said oscillator output is radiated by said antenna and both of said oscillator output and signals received by said antenna are heterodyned by said mixer to yield intermediate frequency signals, means for amplifying and detecting the resulting intermediate frequency signals, and means to adjust the resonant frequency of said reference circuit to shift the operating frequency of said system.

4. In a microwave communication system, a transmitter-receiver comprising, an oscillator, means for modulating said oscillator, a first and a second wave guide directional coupler, an antenna, said first directional coupler being connected between said oscillator and said antenna such that substantially half of said oscillator output is fed to said antenna, said second directional coupler being connected to said first directional coupler such that it receives the second half of said oscillator output, a resonant reference circuit, a frequency control circuit responsive to said oscillator frequency and the resonance frequency of said reference circuit to control the frequency of said oscillator and connected to said second directional coupler such that said frequency control circuit receives substantially half of the signal input to said second directional coupler, a mixer connected to said second directional coupler so as to receive the other half of the signal input to said second directional coupler, said mixer being connected to said first directional coupler such that signals received by said antenna are connected into said mixer, and means for amplifying and detecting the resulting intermediate frequency signal.

5. In a microwave communication system, a transmitter-receiver comprising, an oscillator, means for modulating said oscillator, a first and a second wave guide directional coupler, an antenna, said first directional coupler being connected between said oscillator and said antenna such that substantially half of said oscillator output is fed to said antenna, said second directional coupler being connected to said first directional coupler such that it receives the second half of said oscillator output, a resonant reference circuit, a frequency control circuit responsive to said oscillator frequency and the resonance frequency of said reference circuit to control the frequency of said oscillator and connected to said second directional coupler such that said frequency control circuit receives substantially half of the signal input to said second directional coupler, a mixer connected to said second directional coupler so as to receive the other half of the signal input to said second directional coupler, said mixer being connected to said first directional coupler such that signals received by said antenna are connected into said mixer, means for amplifying and detecting the resulting intermediate frequency signal, and means to adjust the resonant frequency of said reference circuit to shift the operating frequency of said system.

6. In a microwave communication system, a transmitter-receiver comprising, a microwave oscillator, means applying the output of said oscillator to one arm of a first wave guide magic-T junction for division into two equal portions, an antenna coupled to a second arm of said junction for the radiation of the first of said portions, a second wave guide magic-T junction coupled by one arm thereof to a third arm of said first junction to receive the second of said portions and to divide the same equally, a wave guide balanced mixer coupled to a second arm of said second junction to receive substantially a half of the input to said second junction and coupled to a fourth arm of said first junction to receive a portion of the signals received by said antenna and coupled thereto, means for amplifying and detecting the resultant intermediate frequency output of said mixer, a frequency control circuit coupled to a third arm of said second junction to receive substantially half of the input to said second junction and responsive to the frequency thereof to control the frequency of said oscillator, and means to adjust the operating frequency of said system.

7. In a microwave communication system, a transmitter-receiver comprising, a microwave oscillator, means applying the output of said oscillator to one arm of a first wave guide magic-T junction for division into two equal portions, an antenna coupled to a second arm of said junction for the radiation of the first of said portions, a second wave guide magic-T junction coupled by one arm thereof to a third arm of said first junction to receive the second of said portions and to divide the same equally, a wave guide balanced mixer coupled to a second arm of said second junction to receive substantially a half of the input to said second junction and coupled to a fourth arm of said first junction to receive a portion of the signals received by said antenna and coupled thereto, means for amplifying and detecting the resultant intermediate frequency output of said mixer, a frequency control circuit coupled to a third arm of said second junction to receive substantially half of the input to said second junction and responsive to the frequency thereof to control the frequency of said oscillator, said frequency control circuit including a tunable reference cavity resonator, and means to adjust resonant frequency of said resonator to change the operating frequency of said system.

References Cited in the file of this patent

UNITED STATES PATENTS

| | | |
|---|---|---|
| 2,333,719 | Herold | Nov. 9, 1943 |
| 2,475,474 | Bruck et al. | July 5, 1949 |
| 2,486,001 | Bruck et al. | Oct. 25, 1949 |
| 2,518,931 | Pound | Aug. 15, 1950 |
| 2,519,369 | Hansen et al. | Aug. 22, 1950 |